Oct. 26, 1965

R. G. COLCLASER, JR., ETAL

CIRCUIT BREAKERS WITH GRID UNITS HAVING SELECTIVE INTERRUPTING ACTION 3,214,555

Filed April 28, 1961

7 Sheets-Sheet 1

WITNESSES:

Bernard R. Gieguez

James T. Young

INVENTORS
Robert G. Colclaser, Jr. &
Frank L. Reese.
BY
Willard R. Crout
ATTORNEY Oct. 26, 1965 R. G. COLCLASER, JR., ETAL 3,214,555

CIRCUIT BREAKERS WITH GRID UNITS HAVING SELECTIVE INTERRUPTING ACTION

Filed April 28, 1961 7 Sheets-Sheet 2

Oct. 26, 1965 R. G. COLCLASER, JR., ET AL 3,214,555

CIRCUIT BREAKERS WITH GRID UNITS HAVING SELECTIVE INTERRUPTING ACTION

Filed April 28, 1961 7 Sheets-Sheet 7

United States Patent Office 3,214,555

Patented Oct. 26, 1965

3,214,555
CIRCUIT BREAKERS WITH GRID UNITS HAVING SELECTIVE INTERRUPTING ACTION

Robert G. Colclaser, Jr., Delmont, and Frank L. Reese, Wilkinsburg, Pa., assignors to Westinghouse Electric Corporation, East Pittsburgh, Pa., a corporation of Pennsylvania Filed Apr. 28, 1961, Ser. No. 106,241
7 Claims. (Cl. 200—150)

This invention relates to circuit breakers in general, and more particularly to grid structures or arc-extinguishing units with selective interrupting action for circuit breakers in which the drawn arc evolves a gas, such as those of the oil-break type.

A general object of the present invention is to provide an improved arc-extinguishing structure for a circuit interrupter in which a deionizing gas is evolved, such as those of the liquid-break type.

A more specific object of the present invention is to provide an improved arc-extinguishing structure for a circuit breaker which is comprised of three sections, one section being particularly designed for high-current interruption, the second section being particularly designed for middle-range currents, and a third cooperable section being particularly designed to interrupt quickly relatively low-value currents.

The present invention is particularly concerned with a laminated-type grid structure for a circuit interrupter, particularly one of the liquid-break type utilizing mineral oil as the arc-extinguishing medium. However, it is to be clearly understood that although oil is designated herein as being the preferred arc-extinguishing medium for the evolution of un-ionized gas particles, nevertheless, certain features of the present invention are applicable to circuit breakers in which gas-evolving plate materials are preferred for an air-break type of structure. In other words, the present invention is not only suitable for circuit interrupters of the liquid-break type, but it is also suitable for air-break types of circuit interrupters, in which plate structures composed of gas-evolving materials are employed.

Preferably, the present invention is particularly concerned with laminated-type fiber-grid structures suitably clamped together, each of the several fiber plates being suitably configured to provide the proper direction and flow of the un-ionized gas particles.

It has been discovered that for certain applications, particularly during high-current interruption, that an excessive amount of external demonstration in the form of frame deflection and oil throw was observed in prior-art interrupting structures. These effects were primarily caused by the large gas bubble generated by the arc. In addition, with previous grid structures, the arc sometimes restruck at currents around 12,000 amperes during laboratory testing with resultant external demonstration.

It has been discovered that an improved grid structure results when three different sections are combined to cooperate together in the interruption of a range of current values. More particularly, the first, or upper section, is particularly designed for interrupting high-value currents, such, for example, as 15,000 to 24,000 amperes. A second section, preferably positioned intermediate the ends of the laminated grid structure, is particularly designed for the middle range currents, such for example, as 5,000 to 15,000 amperes, and the lower portion of the grid structure is comprised of suitably configured plates particularly designed for the interruption of relatively low-value currents, such as, for example, those below 5,000 amperes. The voltage range may, for example, be 14.4 through 69 kv., with an interrupting rating of 500 through 2,500 mva., for example.

Another object of the present inivention is to provide an improved laminated grid structure particularly suitable for a liquid-break type of circuit interrupter in which a splitter plate is provided adjacent the upper end of the grid structure adjacent the relatively stationary contact to effectively bring about the interruption of relatively large values of currents. In combination with the upper or high-current interrupting section, there is preferably provided an intermediate section consisting of alternate pockets and close-fitting plates to effectively bring about the interruption of middle range currents, for example, 5,000 to 15,000 amperes. Finally, in combination with the aforesaid two sections, and preferably positioned at the lower end of the arc extinguishing grid structure there is preferably provided a magnetic section, involving one or more magnetic plates to effect lateral motion of relatively low-value currents to quickly bring about their rapid interruption.

Further objects and advantages will readily become apparent upon reading the following specification, taken in conjunction with the accompanying drawings, in which.

Figure 1:
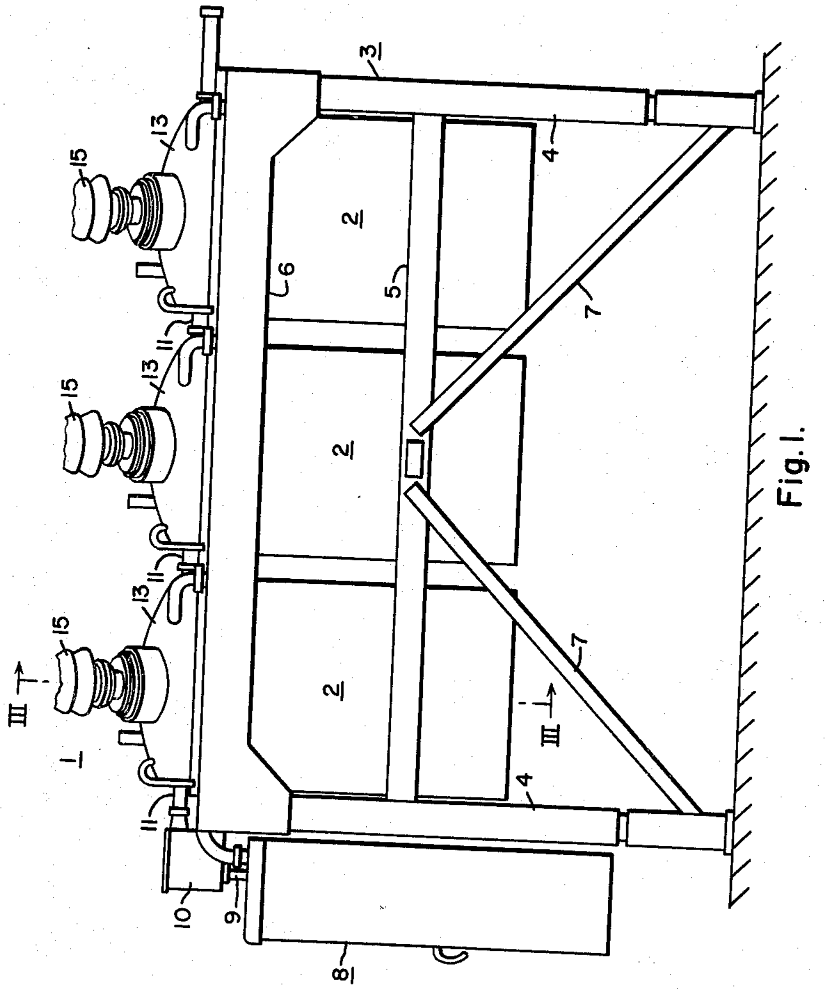
FIGURE 1 is a side elevational view of a frame-mounted liquid-break type of circuit interrupter embodying features of the present invention.
Figure 2:
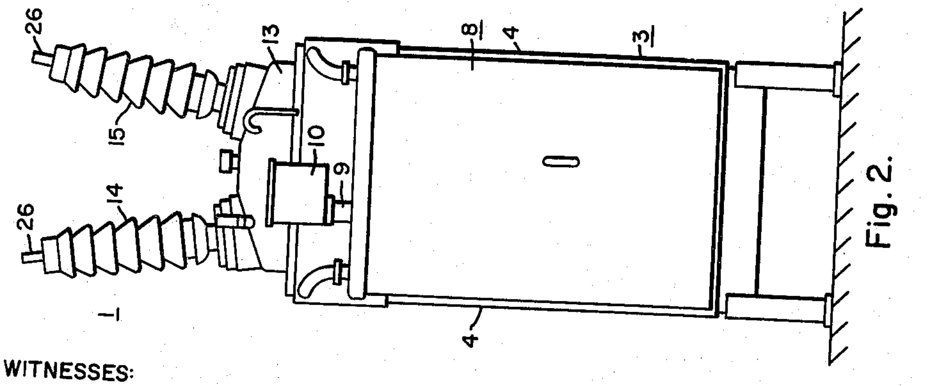
FIG. 2 is an end elevational view of the frame-mounted circuit interrupter of FIG. 1.

Referring to the drawings, and more particularly to FIGS. 1 and 2 thereof, the reference numeral 1 generally designates a circuit interrupter, in this particular instance one of the liquid-break type comprising a plurality of tank structures 2 supported by an upstanding angle-iron frame structure 3. As shown more clearly in FIG. 1, the angle-iron frame structure 3 comprises a plurality of upstanding angle-iron supports 4, horizontally extending braces 5, 6 and diagonally extending support braces 7. As well known by those skilled in the art, the several members are welded together for rigid support of the tank structures 2.

Disposed adjacent one end of the angle-iron frame structure 3 is a mechanism compartment, generally designated by the reference numeral 8, and enclosing a suitable operating mechanism for the circuit interrupter 1. The mechanism, not shown, disposed interiorly within the mechanism compartment 8, is preferably of either the pneumatic type, or the solenoid type and serves to actuate a vertically extending pull rod (not shown), which is disposed within a vertically extending pipe 9. A bell-crank housing 10 encloses a suitable bell-crank (not shown) which interrelates vertical movement of the vertically extending pull rod disposed within the pipe 9 and a horizontally extending pull rod which is positioned interiorly within horizontally extending pipe sections 11 interconnecting the domed covers 13 associated with the several tank structures 2.

Figure 4:
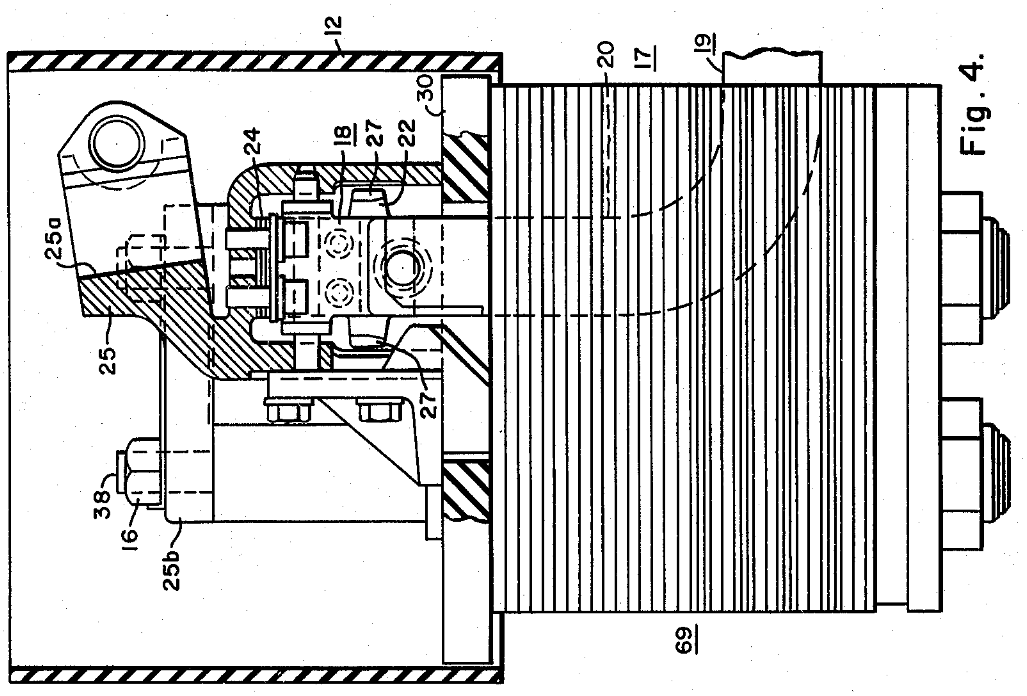
FIG. 4 is an enlarged side elevational view, taken partially in vertical section, of one of the laminated grid structures of the improved circuit interrupter of FIG. 3, the contact structure being illustrated in the closed-circuit position.
Figure 5:
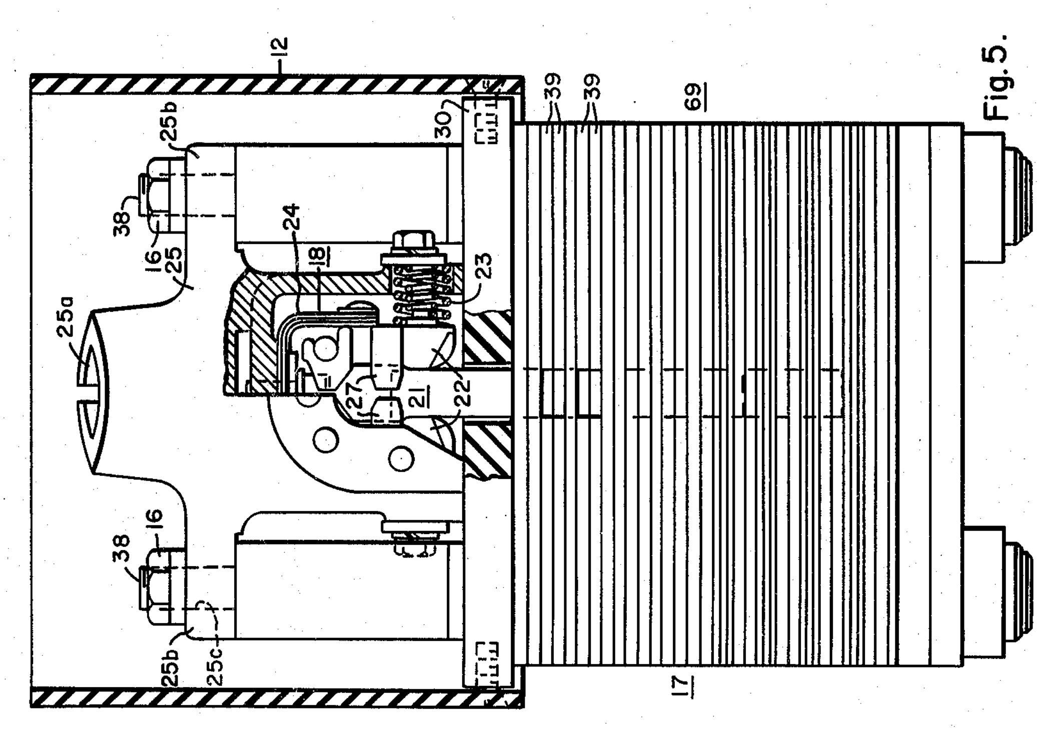
FIG. 5 is an end elevational view, partially in vertical section, of the arc-extinguishing grid unit of FIG. 4, again the contact structure being illustrated in the closed-circuit position.

As shown more clearly in FIG. 2, a pair of downwardly extending terminal bushings 14, 15 protrude downwardly within the domed covers 13 and support a pair of serially-related laminated arc-extinguishing grid structures 17, more clearly shown in FIGS. 4 and 5 of the drawings.

Figure 3:
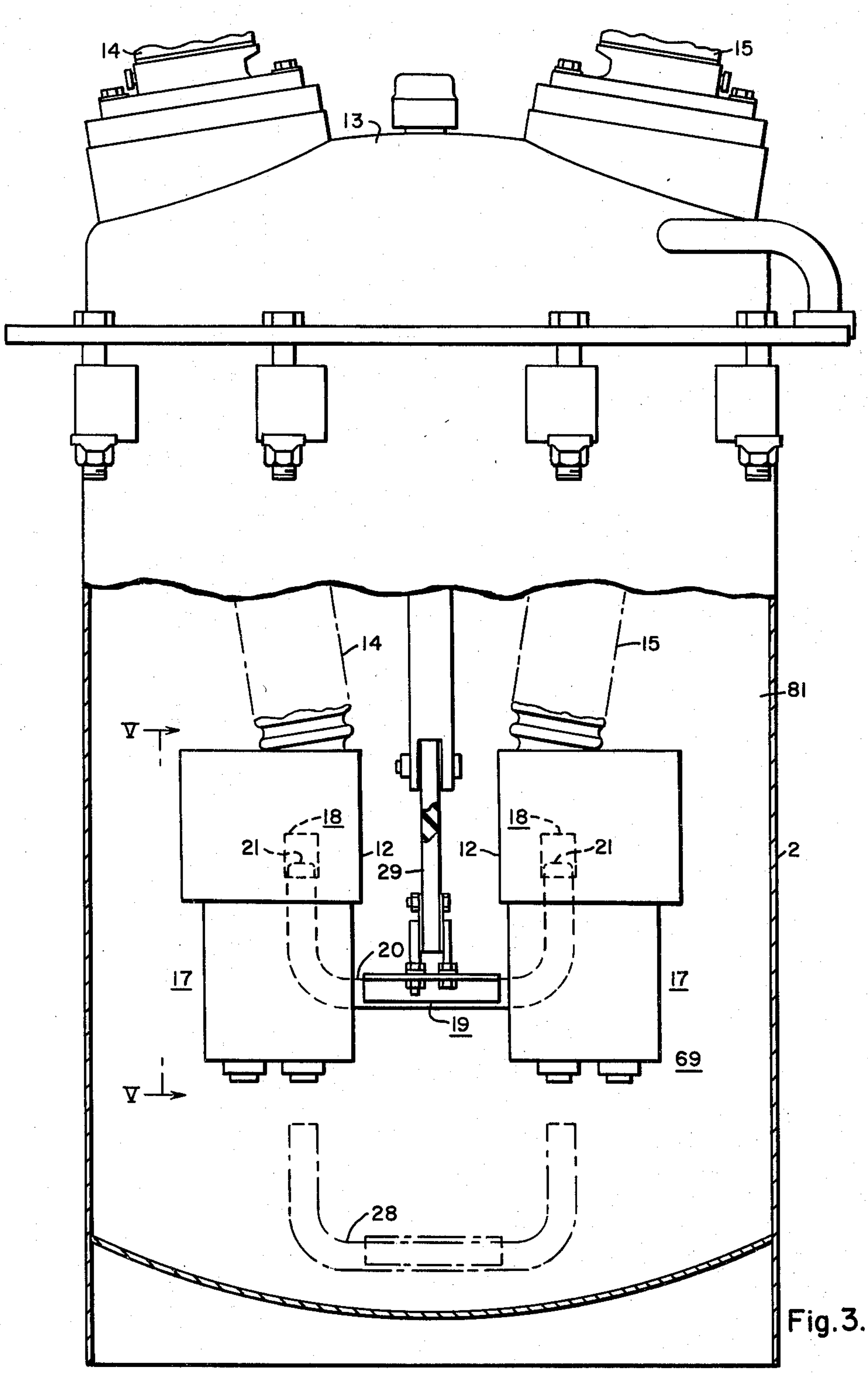
FIG. 3 is a side elevational view, taken partially in vertical section, through one of the three tank structures of FIG. 1, the contact structure being illustrated in the closed-circuit position.

With particular attention being directed to FIG. 3 of the drawings, it will be observed that the relatively stationary contact structures 18 (FIG. 4), associated with each laminated grid structure 17, is electrically interconnected by a vertically movable contact assemblage, generally designated by the reference numeral 19, and comprising a generally U-shaped movable contact mem- 20. As shown in FIG. 3, the movable contact member 20 has a plurality of upstanding tip portions 21, which extend upwardly, in the closed-circuit position shown in FIG. 3, between a pair of inwardly-biased contact fingers 22, as shown more clearly in FIG. 5 of the drawings. A pair of compression springs 23 are utilized to bias the contact fingers 22 inwardly into good contacting engagement with the upper tip portions 21 of the movable U-shaped contact member 20. Preferably, flexible laminated conductors 24 carry the current from the inwardly biased contact fingers 22 to the conducting stationary contact housing 25 and thence through the conductor stud 26 (FIG. 2) extending longitudinally through the terminal bushings 14, 15.

To prevent the inwardly-biased contact fingers 22 coming into too close engagement for later separation thereof by the upper tip portions 21 of the movable contact member 20, pairs of boss or stop portions 27 are provided, which make abutting engagement in the open-circuit position of the interrupter, as indicated by the dotted lines 28 in FIG. 3 of the drawings.

As indicated in FIGS. 4 and 5, the lower ends of the terminal studs 26 are threaded and are threadedly secured and clamped to a bifurcated clamping portion 25*a*, as well known by those skilled in the art. An insulating shield 12 surrounds the housing structure 25, as shown.

As shown in FIG. 3 of the drawings, a reciprocally movable vertical lift rod 29, composed of an insulating material, causes vertical opening and closing motion of the U-shaped movable contact member 20 and interrelates motion thereof with the horizontally extending pull rod (not shown) disposed within the interconnecting pipe portions 11 illustrated in FIG. 1 of the drawings.

Figure 6:
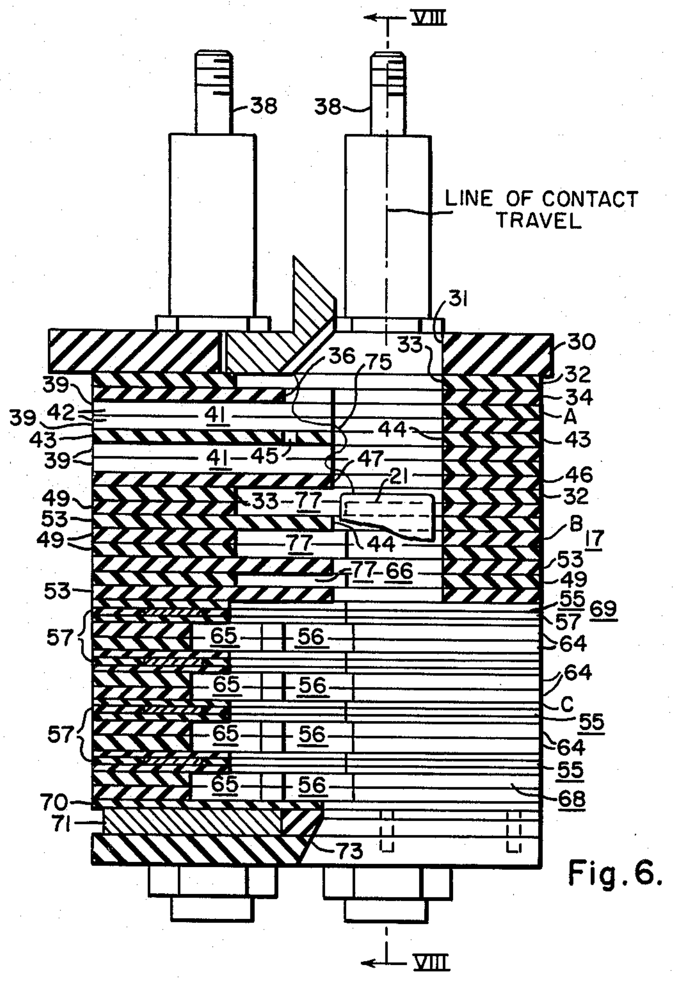
FIG. 6 is a vertical sectional view taken substantially on the line VI—VI of the grid structure of FIG. 7 illustrating fragmentarily the contact structure in the partially open-circuit position.
Figure 8:
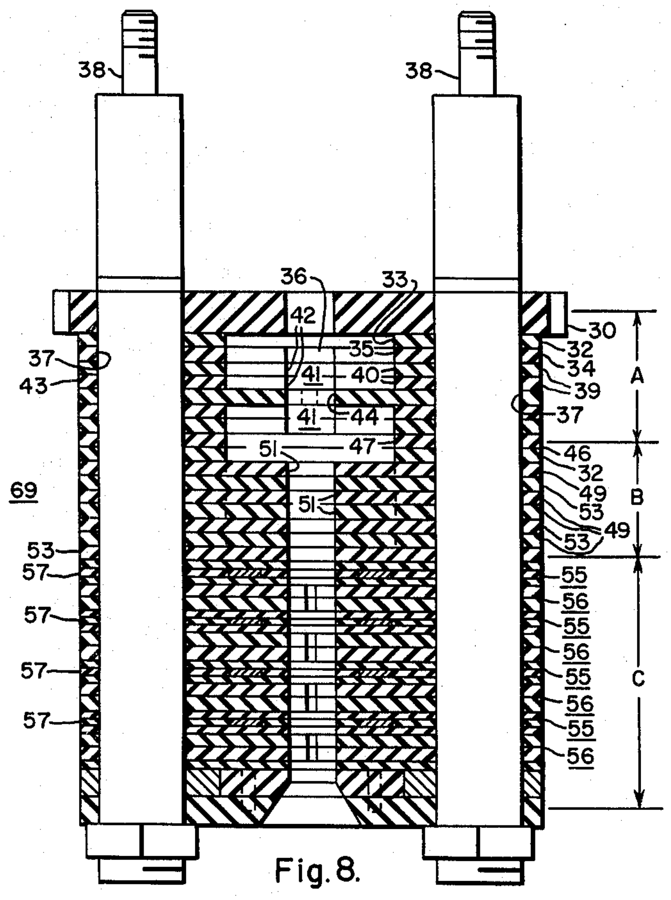
FIG. 8 is a sectional view taken substantially along the line VIII—VIII of FIG. 6 looking in the direction of the arrows, with the arcing horn and contact structure omitted.

The arc-extinguishing grid structure 17 of the improved circuit interrupter 1 of the present invention will now be described. With reference to FIG. 6 of the drawings, it will be observed, generally, that three interrupting sections, indicated by the reference letters A, B, and C are provided. As more fully described hereinafter, the upper section A is particularly suitable for the interruption of large magnitude currents, such, for example, as those in the range of 15,000 to 24,000 amperes. The intermediate interrupting section B is particularly concerned with the middle range currents, say for example, 5,000 to 15,000 amperes, whereas the lower interrupting section C is particularly designed for relatively low magnitude currents, such, for example, as those below 5,000 amperes.

Figure 7:
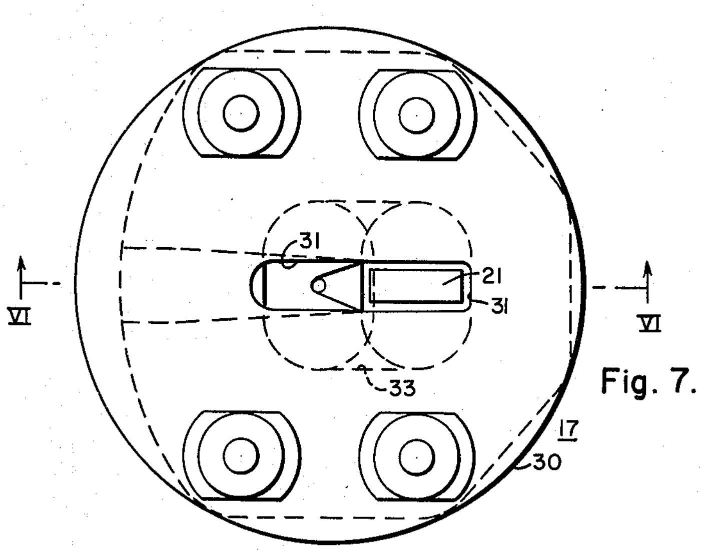
FIG. 7 is a top plan view of the grid structure of FIG. 6 with the arcing horn omitted for clarity.
Figure 9:
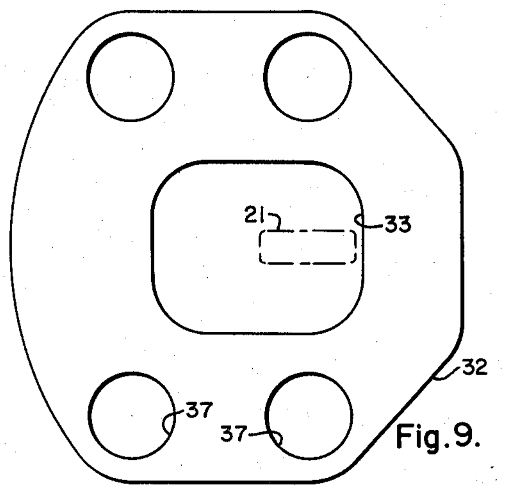
FIGS. 9–20 illustrate plan views of plate details with the position of the movable contact indicated.
Figure 10:
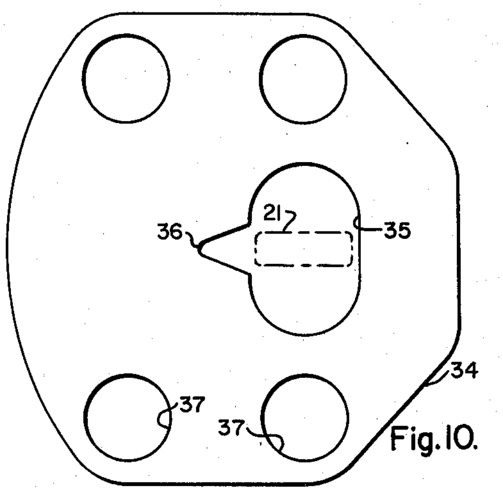

With reference to FIGS. 6 and 7 of the drawings, it will be observed that there is provided an insulating top plate 30 having an elongated slot 31 (FIG. 7) provided therein. Positioned below the top insulating plate 30 is an insulating plate 32, the configuration of which is more clearly shown in FIG. 9 of the drawings. With reference to FIG. 9, it will be noted that the insulating plate 32 has an enlarged cutout portion 33 provided therein. Positioned below the upper insulating plate 32 is an insulating plate 34, more clearly shown in FIG. 10 of the drawings. With reference to FIG. 10, it will be observed that the insulating plate 34 has an opening 35 provided therein which communicates with a laterally extending notch 36, said notch forming a splitter portion for the extension of the arc 75 (FIG. 6), as more fully explained hereinafter.

Both the insulating plates 32, 34, as well as the top plate 30 have apertures 37 provided therein to accommodate insulating tie-rods 38, which fixedly secure the grid structure 17 to the relatively stationary metallic contact housing 25, as more clearly illustrated in FIGS. 4 and 5 of the drawings. More particularly, the metallic contact housing 25 has integrally provided, laterally extending support brackets 25*b*, with apertures 25*c* provided therethrough. The tie-rods 38 extend through the openings 25*c*, and nuts 16, threaded on the tie-rods 38, firmly clamp them and thus the grid unit 17 in a fixed operative position.

Figure 11:
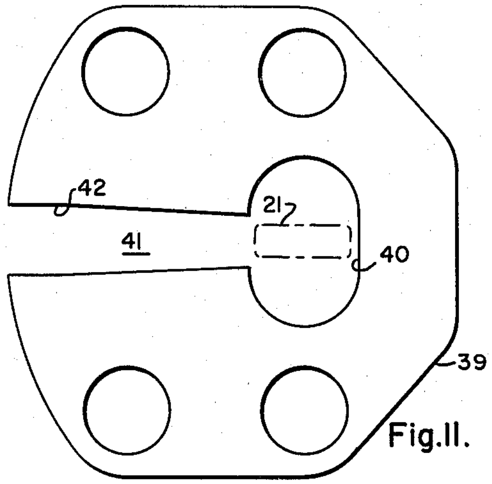

Disposed below the insulating splitter plate 34 is a pair of venting plates 39, the configuration of which is more clearly shown in FIG. 11 of the drawings. As illustrated in FIG. 11, each insulating vent plate 39 has an enlarged opening 40 provided therein, which communicates with a venting passage 41 provided by the alignment of slotted portions 42 cut out of the venting plates 39. With reference to FIG. 6 of the drawings, it will be apparent that the venting plates 39 collectively provide the venting passage 41, which permits the venting of arcing products under pressure out of the interior of the grid structure 17.

Figure 12:
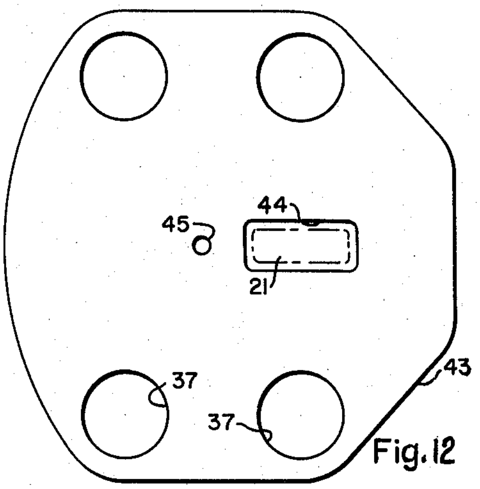

Disposed below the two venting plates 39 is an insulating splitter plate 43, more clearly shown in FIG. 12 of the drawings. With reference to FIG. 12, it will be observed that the insulating splitter plate 43 has a relatively restricted opening 44 provided therein, through which the tip portion 21 of the movable contact 20 passes with a slight clearance as indicated in FIG. 12.

Disposed in close proximity to the restricted aperture 44, provided in the insulator splitter plate 43, is an aperture 45, which permits an interconnecting flow of fluid, such as liquid to pass therethrough between the pair of venting plates 39, above the splitter plate 43 and the pair of venting plates 39 provided below the insulating splitter plate 43, as more clearly shown in FIG. 6 of the drawings.

Figure 13:
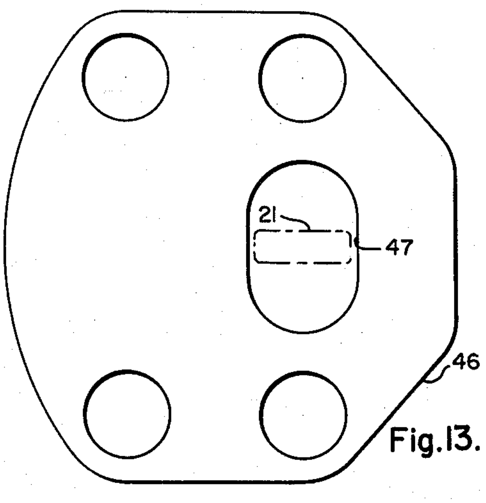

Positioned in contiguous relationship with the lower set of venting plates 39 is an insulating partition plate 46, more clearly illustrated in FIG. 13 of the drawings. With reference to FIG. 6 of the drawings, it will be observed that the insulating partition plate 46 separates the upper selective interrupting section A, particularly suitable for high-current interruption, from the selective intermediate interrupting section B, which is particularly suitable for the middle-range current interruption.

With reference to FIG. 13 of the drawings, it will be noted that the insulating partition plate 46 has provided therein a passageway 47, permitting communication through the plate 46 from the interrupting section B into the venting passages 41 of the upper interrupting section A.

Figure 14:
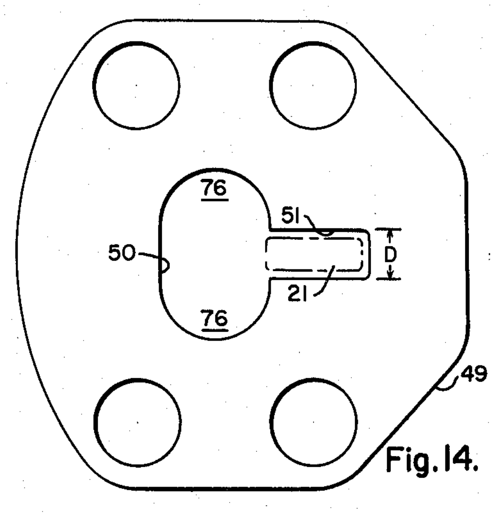

Immediately disposed below the partition plate 46 is a second insulating plate 32, the configuration of which has previously been described in connection with FIG. 9 of the drawings. Then follows an insulating pocket plate 49, more clearly shown in FIG. 14 of the drawings. With reference to FIG. 14, it will be noted that the insulating pocket plate 49 includes a relatively enlarged oil pocket opening 50 communicating with a laterally extending slot-like passage 51 having a width D, which is only slightly wider than the width of the rectangularly-shaped movable contact tip 21.

Disposed immediately below the pocket insulating plate 49 is a second insulating orifice plate 53, which is similar to the insulating plate 43 (FIG. 12) previously described with the exception that the relatively small aperture 45 is omitted. Then follows two pocket insulating plates 49, a second insulating plate 53, an additional plate 49 and a final insulating plate 53 constituting the lowermost insulating plate of the middle-range interrupting section B.

Figure 16:
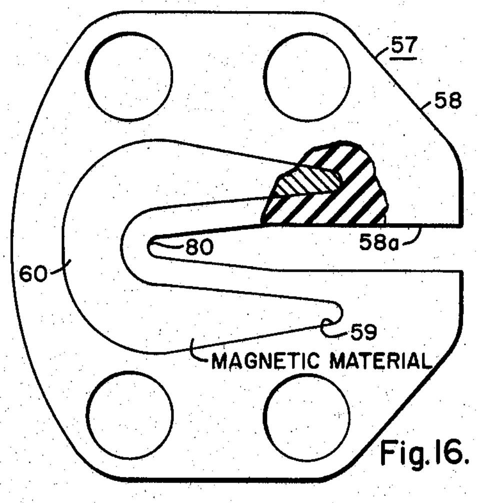

The lowermost interrupting section C of the grid unit 17, particularly designed for the interruption of relatively low-value currents, will now be described. With reference to FIG. 6 of the drawings, it will be observed that the lower interruption section C permits side venting of the liquid and comprises a plurality, in this particular instance four, magnetic venting plate sections 55 interspersed with venting pocket-plate sections 56. The magnetic venting plate sections 55 individually comprise a magnetic venting plate 57 more clearly shown in FIG. 16 of the drawings. With reference to FIG. 16, it will be observed that the magnetic plate 57 comprises a venting liner plate 58 having a cutout portion 59, within which is positioned a magnetic plate 60, the configuration of which is more clearly apparent from a study of FIG. 16 of the drawings.

In addition, the venting liner insulating plate 58 has a tapered venting slot 58*a* associated therewith to permit side venting of the arc-extinguishing fluid, such as oil 81.

Figure 15:
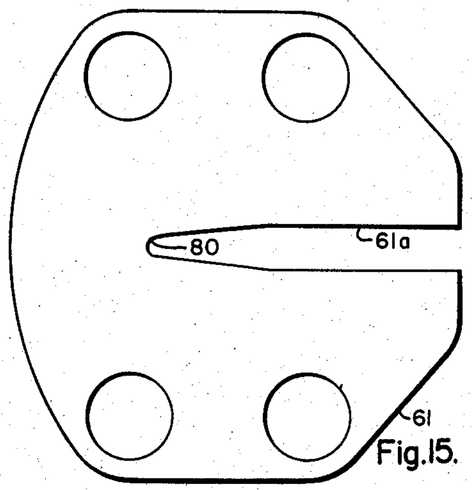

Positioned on either side of the magnetic plate 57 is an insulating vented shield plate 61, more clearly shown in FIG. 15 of the drawings. The purpose of the insulating shield plate 61 and the liner plate 58 is to protect the magnetic plate 60, which is preferably fabricated from steel, from the effects of arcing during the opening operation of the interrupter 1. As shown in FIG. 15, the shield plate has a venting slot 61*a*, which has the same configuration as the venting slot 58*a* of the magnetic plate 57.

Figure 17:
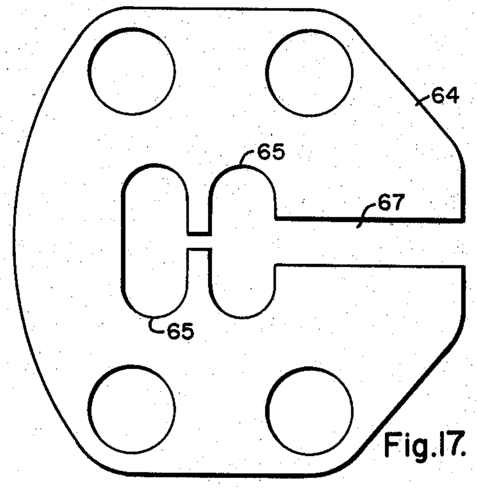

The pocket insulating vent plate sections 56 comprise pairs of vented pocket insulating plates 64, the configuration of which is more clearly apparent from a study of FIG. 17 of the drawings.

With reference to FIG. 17, it will be observed that each vented pocket insulating plate 64 forms a plurality of pocket portions 65, which serve to retain a plentiful supply of arc-extinguishing fluid, such as oil 81, in immediate proximity to the arcing passage 66 extending longitudinally of the interrupting unit 17. In addition, the pocket portions 65 communicate with a laterally extending venting passage 67, which aligns with venting portions 58*a*, 61*a* of adjacently disposed plates 58, 61 respectively to form an elongated side venting passage, generally designated by the reference numeral 68 in the drawings. As shown in FIG. 6, the venting slot 68 provides communication between the arcing passage 66 and the region 69 exteriorly of the arc-extinguishing unit 17.

Figure 18:
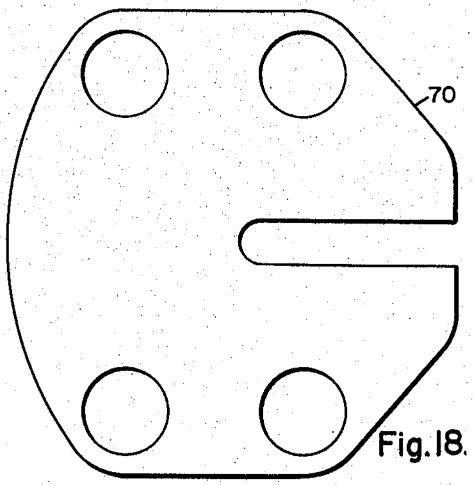
Figure 19:
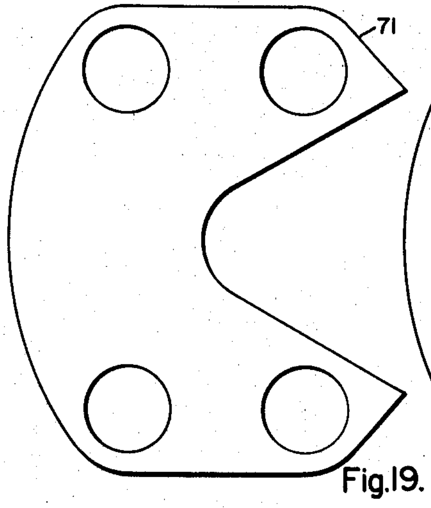
Figure 20:
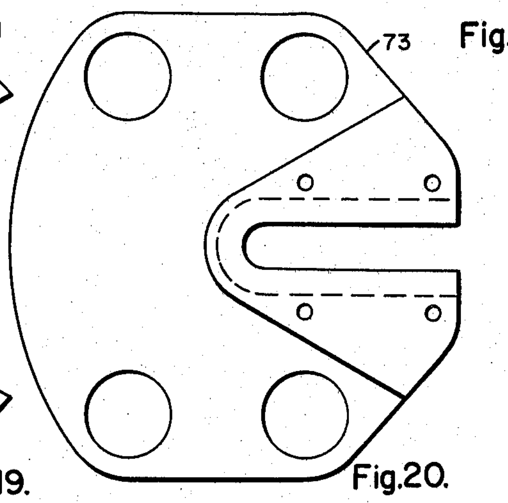
Figure 21:
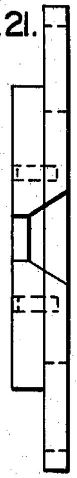
FIG. 21 is an end elevational view of the plate detail of FIG. 20.

The lower end of the relatively low-current interrupting section C is closed by an insulating plate 70 more clearly shown in FIG. 18 of the drawings. The bottom of the interrupting grid unit 17 is closed by a metallic plate 71, as shown in FIG. 19, which cooperates with a liner plate 73 illustrated in FIGS. 20 and 21 of the drawings.

The opening operation of the improved circuit-interrupting grid unit 17 will now be explained. During the opening operation, the mechanism disposed within the mechanism compartment 8 is effective to cause downward opening movement of the several insulating lift rods 29 associated with each of the tank structures 2 of the interrupter 1. The downward opening movement of the insulating lift rod 29 correspondingly effects downward opening separating movement of the contact tips 21 away from the spring-biased contact fingers 22 thereby drawing an arc 75 more clearly shown in FIG. 6 of the drawings. With reference to FIG. 6, it will be observed that the arc 75 is moved laterally in the direction of the exhaust ports 41 by the pressure caused by the gasification of the surrounding oil 81. If the current being interrupted is a relatively high-current arc, say 15,000 to 24,000 amperes for example, the arc 75 will be interrupted in the upper high-current interrupting range A of the interrupting grid unit 17. This extinguishing action is facilitated by the looping of the arc 75 into the venting passages 41 as shown in FIG. 6. The splitter plate 43, in extending inwardly of the grid unit close to the line of contact travel (FIG. 6), effectively increases the arc length within venting passages 41, enhancing the deionizing action of the oil and gas which is vented through the lateral ports 41. In addition, the small hole 45 in plate 43 tends to keep the arc in contact with the splitter plate 43, increasing the amount of gas evolved from the fiber. The hole 45 is effective because the arc 75 attempts to shorten by striking through the hole 45 instead of looping as shown in FIGURE 6.

During the interruption of medium-range currents, such as 5,000 to 15,000 amperes, for example, the pressure generated within the upper interrupting section A is not sufficient to quickly effect extinction of the arc. In this eventuality, the arc 75 is drawn downwardly into the pocket portions 77, which retain a plentiful supply of arc-extinguishing liquid, such as oil 81, within the arcing passage 66. Because of restrictions in the plates 53, the gasification within such pressure generating chambers 77 causes an injection of such gasified oil upwardly through passage 66 and the relatively enlarged opening 47 provided by the partition plate 46. Thus, such gasified oil is forced upwardly through the opening 47 toward the venting passages 41 provided by the upper venting plates 39. The restrictive plates 53 maintain a relatively high pressure in the upper portions A and B of the arc-extinguishing unit 17.

Should, however, the arc being interrupted be of a relatively low value, say below 5,000 amperes in magnitude, the amount of pressure generated by such a low-amperage arc within the upper portion of the grid unit 17 will be relatively low, and in such event the arc 75 will hang on and possibly be drawn into the lower magnetic plate portions 55 with the interspersed pocket-plate portions 56. The magnetic action exerted upon the arc 75 by the magnetic plates 60 will draw the arc 75 laterally into the closed ends 80 of the slots 58*a* of the magnetic plates 57 constituting a restricted portion and thereby cause its restriction to consequently increase the arc voltage. The arc-extinguishing dielectric 81 retained within the pocket portions 65 of the pocket insulating plates 64 (FIG. 17) will provide a plentiful supply of un-ionized gas particles which will flow generally laterally through the arc stream 75 and out toward the venting slot 68. The result will be a quick extinction of such a low-current arc 75.

Figure 22:
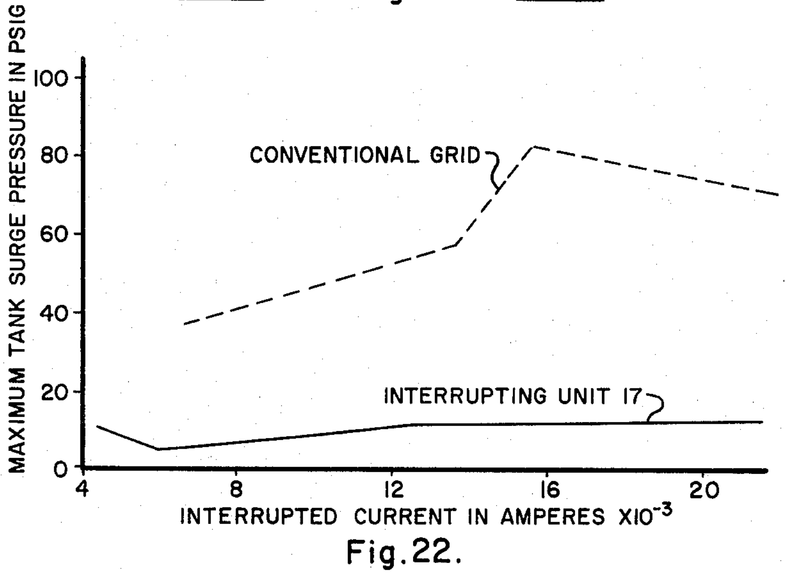
FIG. 22 is a graph illustrating the improved pressure performance of the improved grid unit of the present invention.

From the foregoing description of the interrupting unit 17 it will be apparent that there is provided a novel type of interrupting unit having various specified sections thereof particularly designed for the interruption of particular amperage-value currents. The cooperation and combination between the interrupting sections A, B and C ensures a quick extinguishment of the arc 75 regardless of current value. When high-current arcs are drawn within the top section A of the grid unit 17, the extinguishing action is so efficient that the arc 75 is extinguished before the lower sections B and C are reached. The middle and lower interrupting sections of the grid unit 17 are particularly efficient in providing a fluid flow which quickly effects extinction of the arc. The result of the aforesaid grid design is to improve the interruption performance at high currents with a reduction in tank pressures. Moreover, the arcing time is reduced by approximately one-half cycle over conventional designs. A further improvement is the reduction in external demonstration. This is partially due to the general reduction in arcing time, but also is due to the inherent better arc control of the new grid 17. It is advisable to reduce the arc voltage in breakers of this type, as this directly affects the amount of gas generated. Grids previously employed produced more arc voltage than the novel-type grid herein disclosed by the action of its magnetic plates. The arc length was quickly increased as the arc was pinched and forced into slots, producing a large amount of arc voltage and corresponding arc energy. Tank pressure is a qualitative index of arc energy. A reduction of pressure surges will greatly reduce the external demonstration. FIG. 22 shows the great reduction in tank surge pressure obtained by utilization of the new grid unit 17 illustrated in FIG. 6 of the drawings.

The laminated grid unit 17 comprising a plurality of suitably configured fiber plates has been particularly effective at high-current interruption yet performs very satisfactorily at the low currents.

Laboratory tests have shown excellent results at currents to 33,000 amperes. The use of the grid unit described raises the rating of the breaker from 2,500 mva. to 3,500 mva. at 69 kv.

From the foregoing description of the invention, it will be apparent that there is provided an improved arc-extinguishing grid unit particularly suitable for liquid-type circuit interrupters, such as those employing mineral oil 81 as the arc-extinguishing medium. However, it is to be clearly understood that certain features of the present invention are adaptable to air-type circuit interrupters in which a gas-evolving material is employed as the arc-extinguishing medium instead of oil. In other words, it will be apparent that the reason for the quick arc-extinguishing action over the entire current range is in large part attributed to the effective directing and flow conditions brought about within the grid unit 17. These flow conditions can easily be effected by utilizing a liquid dielectric, such as oil, or for other applications gas could be evolved by action of the arc directly upon gas-evolving plates, as well understood by those skilled in the art.

Although there has been illustrated and described a particular grid unit, it is to be clearly understood that the same was merely for the purpose of illustration and that changes and modifications may readily be made therein by those skilled in the art, without departing from the spirit and scope of the invention.

We claim as our invention:

1. An arc-extinguishing unit for a liquid-break type of circuit interrupter including a relatively stationary contact structure disposed adjacent one end of the unit, an elongated movable contact movable within said unit and cooperable with the relatively stationary contact structure to establish an arc, the arc-extinguishing unit including three selective interrupting sections, namely a first selective interrupting section particularly suitable for interrupting arcs of relatively high-current magnitude, a second selective current interrupting section particularly suitable for interrupting arcs of middle-range current magnitude, and a third selective interrupting section adjacent the other end of the unit particularly suitable for interrupting arcs of relatively low-magnitude current, said first section comprising a pair of venting passages having a splitter-plate portion disposed therebetween, the splitter-plate portion extending inwardly of the unit close to the line of contact travel, said intermediate middle-range current interrupting section including a plurality of plate portions having relatively close-fitting orifice openings closely confining the movable contact with pressure-generating chambers interspersed therebetween, and said third interrupting section including a restricted portion and a lateral vented portion with magnetic means for moving the arc laterally into said restricted portion of the arc passage, and said third interrupting section being the only portion of the grid unit having magnetic means.

2. In a liquid-break type of circuit interrupter, a tank containing a dielectric liquid, a pair of terminal bushings extending downwardly within said tank, each of said terminal bushings supporting an arc-extinguishing grid unit within the tank, an interrupting cross-bar for electrically interconnecting the two arc-extinguishing units, each arc-extinguishing unit including a relatively stationary contact structure disposed adjacent the upper end of the unit in immediate proximity to the lower end of the respective terminal bushing, an elongated movable contact, each arc-extinguishing unit including three selective interrupting sections, namely a first selective interrupting section particularly suitable for interrupting relatively high-current magnitudes, a second selective current interrupting section particularly suitable for interrupting middle-range currents, and a lower or third selective interrupting section particularly suitable for interrupting relatively low-magnitude currents, said first section comprising a pair of venting passages having a splitter-plate portion disposed therebetween, the splitter-plate portion extending inwardly of the grid unit close to the line of contact travel, said intermediate middle-range current interrupting section including a plurality of plate portions having relatively close-fitting orifice openings closely confining the movable contact with pressure-generating chambers interspersed therebetween, and said third interrupting section including a restricted portion and a lateral vented portion with a plurality of slotted magnetic plates for moving the arc laterally into said restricted portion of the arc passage, and said third interrupting section being the only portion of the grid unit having magnetic plates.

3. An arc-extinguishing unit for a liquid-break type of circuit interrupter including a relatively stationary contact structure disposed adjacent one end of the unit, an elongated movable contact, the arc-extinguishing unit including three selective interrupting sections, namely a first selective interrupting section particularly suitable for interrupting relatively high-current magnitudes, a second selective current interrupting section particularly suitable for interrupting middle-range currents, and a third selective interrupting section disposed adjacent the other end of the unit particularly suitable for interrupting relatively low-magnitude currents, said first section comprising a pair of venting passages having a splitter-plate portion disposed therebetween, the splitter-plate portion extending inwardly of the grid unit close to the line of contact travel, said splitter-plate portion having a closed hole therethrough close to the line of contact travel, said intermediate middle-range current interrupting section including a plurality of plate portions having relatively close-fitting orifice openings closely confining the movable contacts with pressure-generating chambers interspersed therebetween, and said third interrupting section including a restricted portion and a lateral vented portion with magnetic means for moving the arc laterally into said restricted portion of the arc passage, and said third interrupting section being the only portion of the arc-extinguishing unit having magnetic means.

4. An arc-extinguishing unit for a liquid-break type of circuit interrupter including a relatively stationary contact structure disposed adjacent the one end of the unit, and elongated movable contact, the arc-extinguishing unit including three selective interrupting sections, namely a first selective interrupting section particularly suitable for interrupting relatively high-current magnitudes, a second selective current interrupting section particularly suitable for interrupting middle-range currents, and a third selective interrupting section disposed adjacent the other end of the unit particularly suitable for interrupting relatively low-magnitude currents, said first section comprising a pair of venting passages having a splitter-plate portion disposed therebetween, the splitter-plate portion extending inwardly of the grid unit close to the line of contact travel, said splitter-plate portion having a tightly restricted opening for said movable contact, said intermediate middle-range current interrupting section including a plurality of plate portions having relatively close-fitting orifice openings closely confining the movable contact with pressure-generating chambers interspersed therebetween, and said third interrupting section including a restricted portion and a lateral vented portion with magnetic means for moving the arc laterally into said restricted portion of the arc passage, and said third interrupting section being the only portion of the arc-extinguishing unit having magnetic means.

5. An arc-extinguishing unit for a liquid-break type of circuit interrupter including a relatively stationary contact structure disposed adjacent one end of the unit, an elongated movable contact, the arc-extinguishing unit being of laminated plate construction and including three selective interrupting sections, namely a first selective interrupting section particularly suitable for interrupting relatively high-current magnitudes, a second selective current interrupting section particularly suitable for interrupting middle-range currents, and a lower or third selective interrupting section particularly suitable for interrupting relatively low-magnitude currents, said first section comprising a pair of venting passages having a splitter-plate disposed therebetween, the splitter-plate extending inwardly of the grid unit close to the line of contact travel, said intermediate middle-range current interrupting section including a plurality of plates having relatively close-fitting orifice openings closely confining the movable contact with pressure-generating chambers interspersed therebetween, and said third interrupting section including a restricted portion and a lateral vented portion with a plurality of slotted magnetic plates for moving the arc laterally into said restricted portion of the arc passage, and said third interrupting section being the only portion of the grid unit having magnetic plates.

6. An arc-extinguishing unit for a liquid-break type of circuit interrupter including a relatively stationary contact structure disposed adjacent one end of the unit, an elongated movable contact, the arc-extinguishing unit including three selective interrupting sections, namely a first selective interrupting section particularly suitable for interrupting relatively high-current magnitudes, a second selective current interrupting section particularly suitable for interrupting middle-range currents, and a third selective interrupting section disposed adjacent the other end of the unit particularly suitable for interrupting relatively low-magnitude currents, said first section comprising a pair of venting passages extending in one lateral direction having a splitter-plate portion disposed therebetween, the splitter-plate portion extending inwardly of the grid unit close to the line of contact travel, said intermediate middle-range current interrupting section including a plurality of plate portions having relatively close-fitting orifice openings closely confining the movable contact with pressure-generating chambers interspersed therebetween, and said third interrupting section including a restricted portion and a lateral vented portion extending in the opposite lateral direction from said pair of venting passages, said third section also having magnetic means for moving the arc laterally into said restricted portion of the arc passage, and said third interrupting section being the only portion of the grid unit having magnetic means.

7. In a liquid-break type of circuit interrupter, a tank containing a dielectric liquid, a pair of terminal bushings extending downwardly within said tank, each of said terminal bushings supporting an arc-extinguishing grid unit within the tank, an interrupting cross-bar for electrically interconnecting the two arc-extinguishing units, each arc-extinguishing unit including a relatively stationary contact structure disposed adjacent the upper end of the unit in immediate proximity to the lower end of the respective terminal bushing, an elongated movable contact, each arc-extinguishing unit being of laminated fiber plate construction and including three selective interrupting sections, namely a first selective interrupting section particularly suitable for interrupting relatively high-current magnitudes, a second selective current interrupting section particularly suitable for interrupting middle-range currents, and a lower or third selective interrupting section particularly suitable for interrupting relatively low-magnitude currents, said first section comprising a pair of venting passages having a fiber splitter-plate disposed therebetween, the splitter-plate extending inwardly of the grid unit close to the line of contact travel, said intermediate middle-range current interrupting section including a plurality of fiber plates having relatively close-fitting orifice openings closely confining the movable contact with pressure-generating chambers interspersed therebetween, and said third interrupting section including a restricted portion and a lateral vented portion with a plurality of slotted magnetic plates for moving the arc laterally into said restricted portion of the arc passage, and said third interrupting section being the only portion of the grid unit having magnetic plates.

References Cited by the Examiner

UNITED STATES PATENTS

| | | | |
|---|---|---|---|
| 1,955,216 | 4/34 | Whitney et al. | 200—150 |
| 1,981,404 | 11/34 | Whitney et al. | 200—150 |
| 2,039,054 | 4/36 | Boden et al. | 200—150 |
| 2,488,131 | 11/49 | Leeds | 200—145 |
| 2,647,973 | 8/53 | Umphrey | 200—150 |
| 2,717,294 | 9/55 | Balentine | 200—150 |

FOREIGN PATENTS

| | | |
|---|---|---|
| 521,861 | 6/40 | Great Britain. |

KATHLEEN H. CLAFFY, *Primary Examiner.*

MAX L. LEVY, ROBERT K. SCHAEFER, BERNARD A. GILHEANY, *Examiners.*